(12) United States Patent
Shaffer

(10) Patent No.: US 9,139,452 B2
(45) Date of Patent: Sep. 22, 2015

(54) WATER FILTER ASSEMBLY

(71) Applicant: General Electric Company, Schenectady, NY (US)

(72) Inventor: Timothy Scott Shaffer, La Grange, KY (US)

(73) Assignee: General Electric Company, Schenectady, NY (US)

( * ) Notice: Subject to any disclaimer, the term of this patent is extended or adjusted under 35 U.S.C. 154(b) by 8 days.

(21) Appl. No.: 13/872,511

(22) Filed: Apr. 29, 2013

(65) Prior Publication Data

US 2014/0319033 A1 Oct. 30, 2014

(51) Int. Cl.
*C02F 1/00* (2006.01)
*B01D 35/153* (2006.01)

(52) U.S. Cl.
CPC ............. *C02F 1/003* (2013.01); *B01D 35/153* (2013.01); *B01D 2201/303* (2013.01); *C02F 1/001* (2013.01); *C02F 2201/004* (2013.01); *C02F 2201/006* (2013.01)

(58) Field of Classification Search
CPC .. B01D 35/157; B01D 35/1576; B01D 37/04; B01D 35/153; B01D 21/30; B01D 21/34; B01D 23/20; B01D 23/26; B01D 24/10; B01D 24/18; B01D 25/30; B01D 29/0072; B01D 29/0084; B01D 29/11; B01D 29/114; B01D 29/115; B01D 29/31; B01D 29/60; B01D 29/603; B01D 33/00; B01D 33/0003; B01D 33/01; B01D 33/0116; B01D 35/00; B01D 35/027; B01D 35/147; B01D 35/1475; B01D 35/30; B01D 2201/04; B01D 2201/0407; B01D 2201/16; B01D 2201/167; B01D 2201/29; B01D 2201/291; B01D 2201/293; B01D 2201/295; B01D 2201/30; B01D 2201/301; B01D 2201/31; B01D 2201/40; B01D 2201/4015; B01D 2201/4023; B01D 2201/4038; B01D 2201/303; B01D 2201/0461; C02F 2201/004; C02F 2201/005; C02F 2201/006; C02F 2201/007; C02F 2307/00
See application file for complete search history.

(56) References Cited

U.S. PATENT DOCUMENTS

| | | | |
|---|---|---|---|
| 644,537 A * | 2/1900 | nickey | 210/313 |
| 5,154,823 A | 10/1992 | Ma et al. | |
| 6,457,322 B1 * | 10/2002 | Kim et al. | 62/318 |
| 2005/0167352 A1 * | 8/2005 | Burrows et al. | 210/241 |
| 2005/0218060 A1 * | 10/2005 | Knoll et al. | 210/234 |
| 2006/0124532 A1 * | 6/2006 | Magnusson et al. | 210/420 |
| 2010/0314398 A1 * | 12/2010 | Gocze | 220/592.2 |
| 2011/0042329 A1 * | 2/2011 | Hacker et al. | 210/806 |

OTHER PUBLICATIONS

Google search for "water filter cylinder drain valve," search performed Jun. 12, 2014—see first result.*

* cited by examiner

*Primary Examiner* — Rohit K Dewan
(74) *Attorney, Agent, or Firm* — Dority & Manning, P.A.

(57) ABSTRACT

A water filter assembly is provided. The water filter assembly includes a casing that is selectively mounted to a manifold. A filtering media is positioned within the casing for filtering a flow of water through the casing. The water filter assembly also includes features for hindering spilling of water during changing of the filtering media.

20 Claims, 6 Drawing Sheets

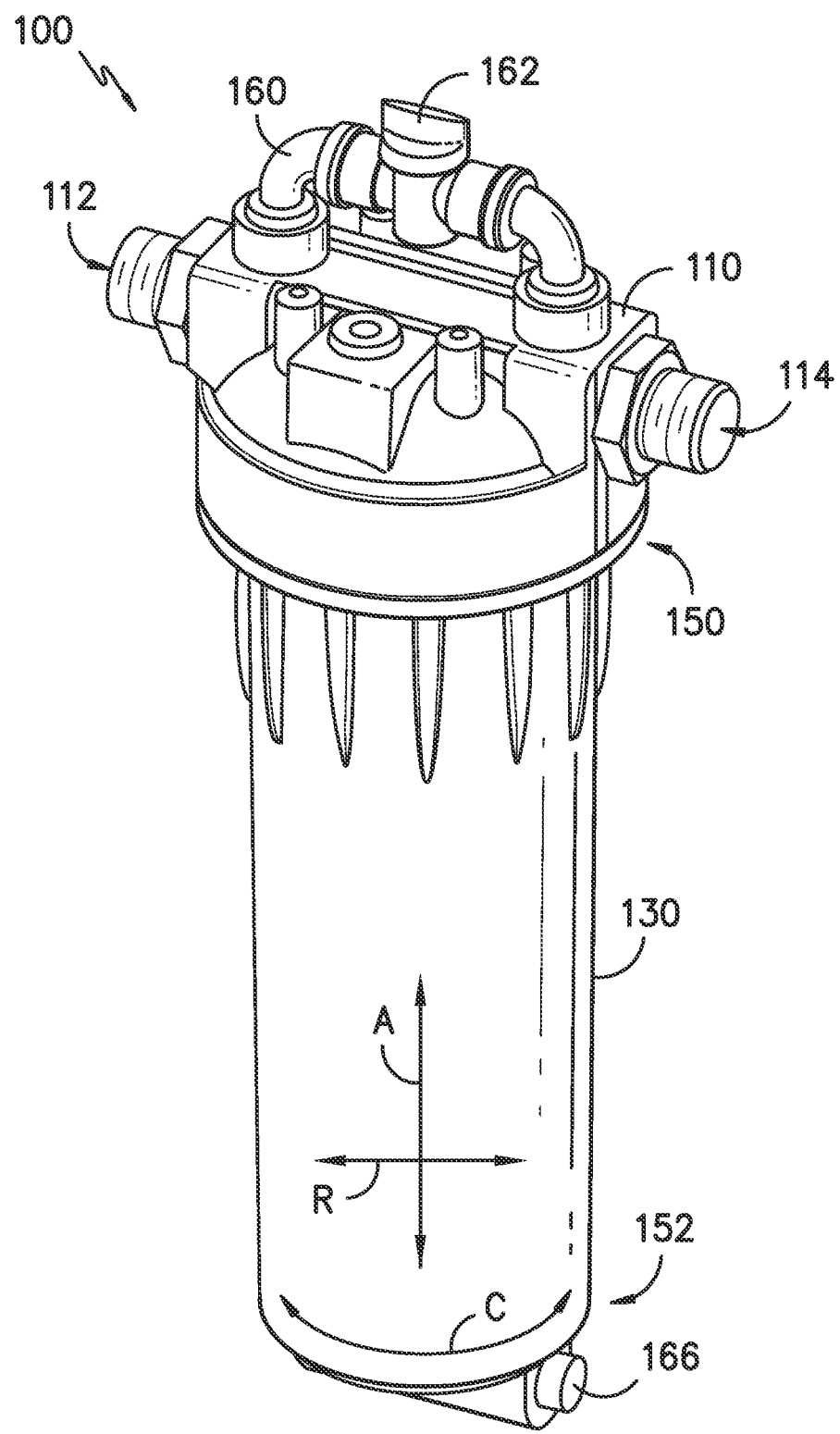
FIG. -1-

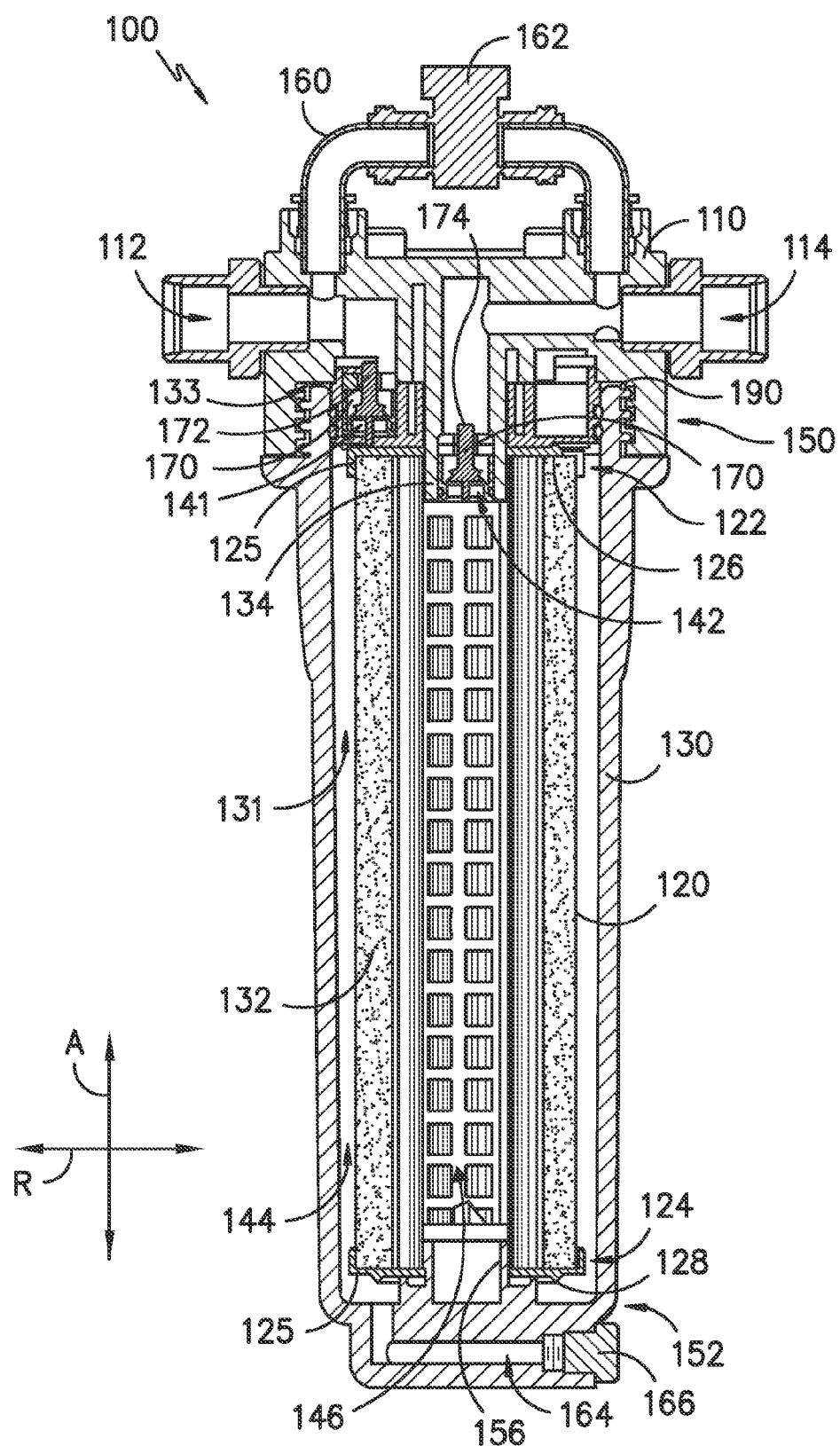
FIG. -2-

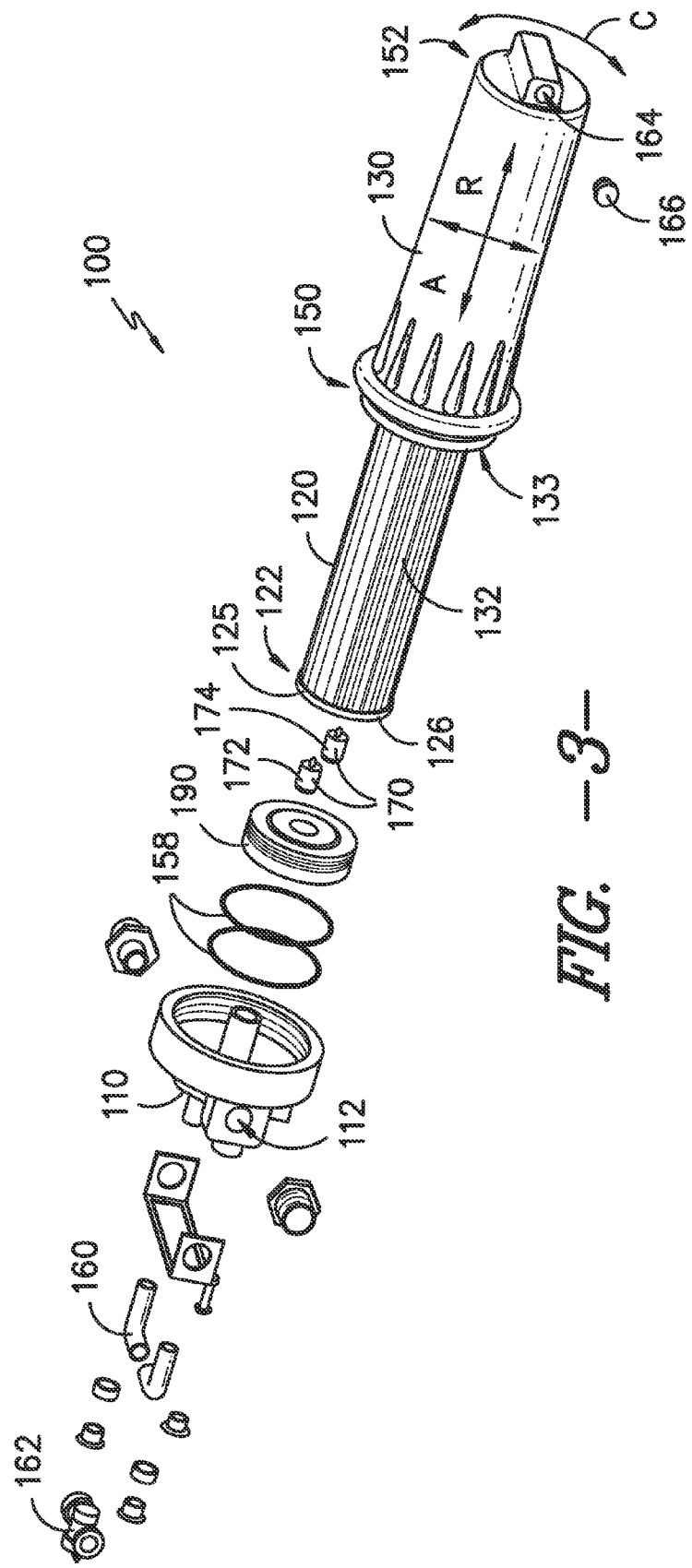
FIG. -3-

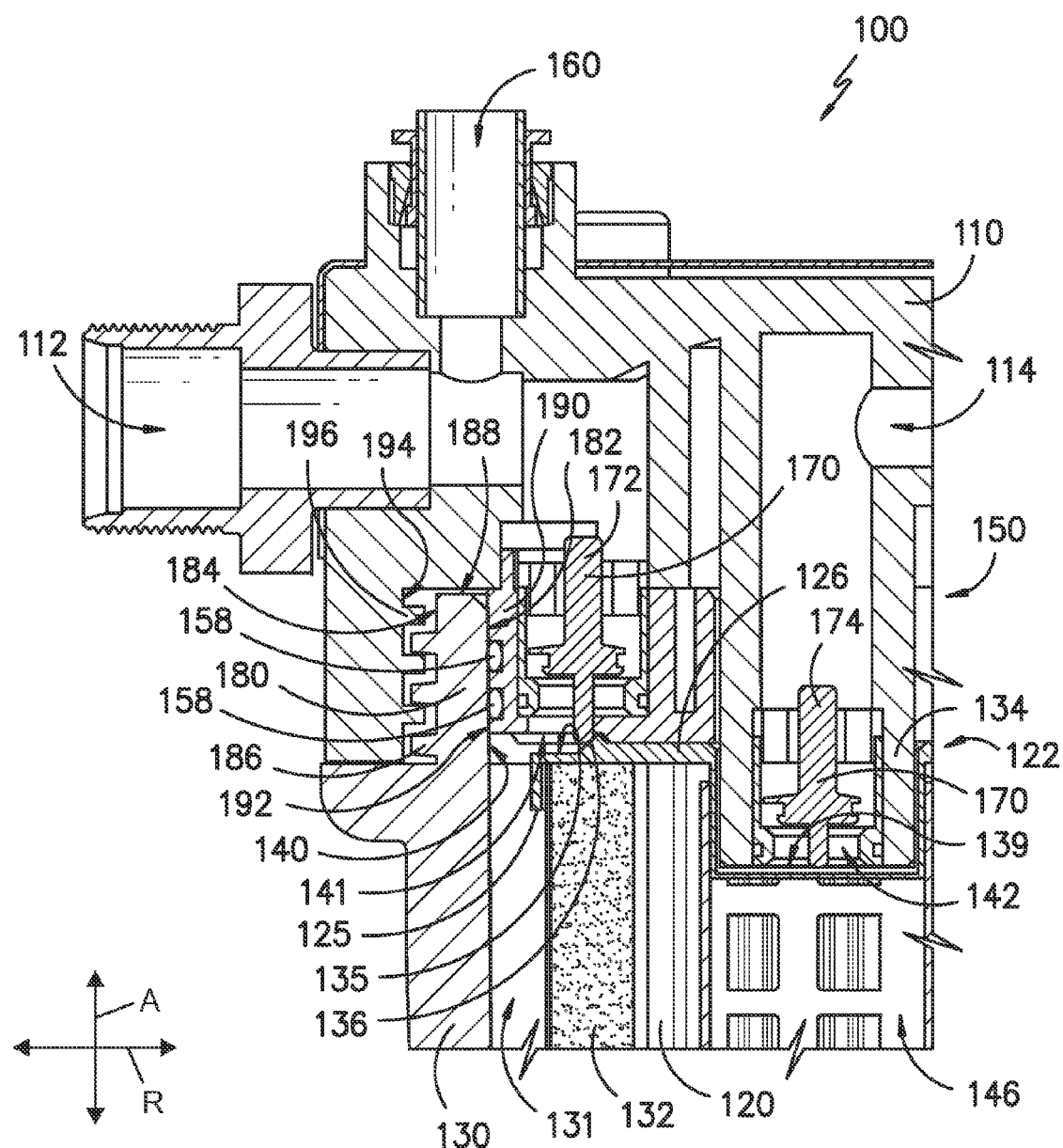
FIG. -4-

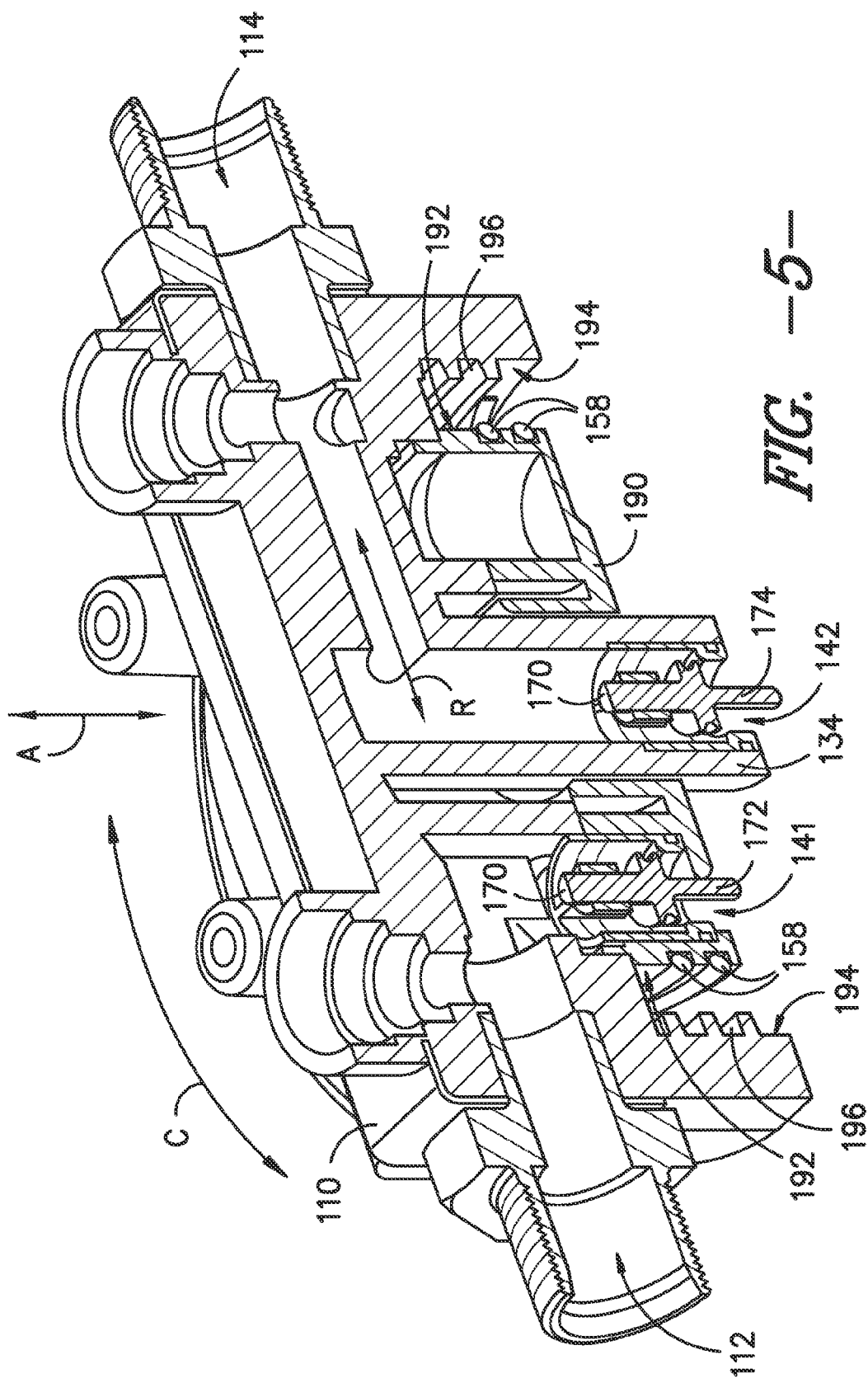
FIG. -5-

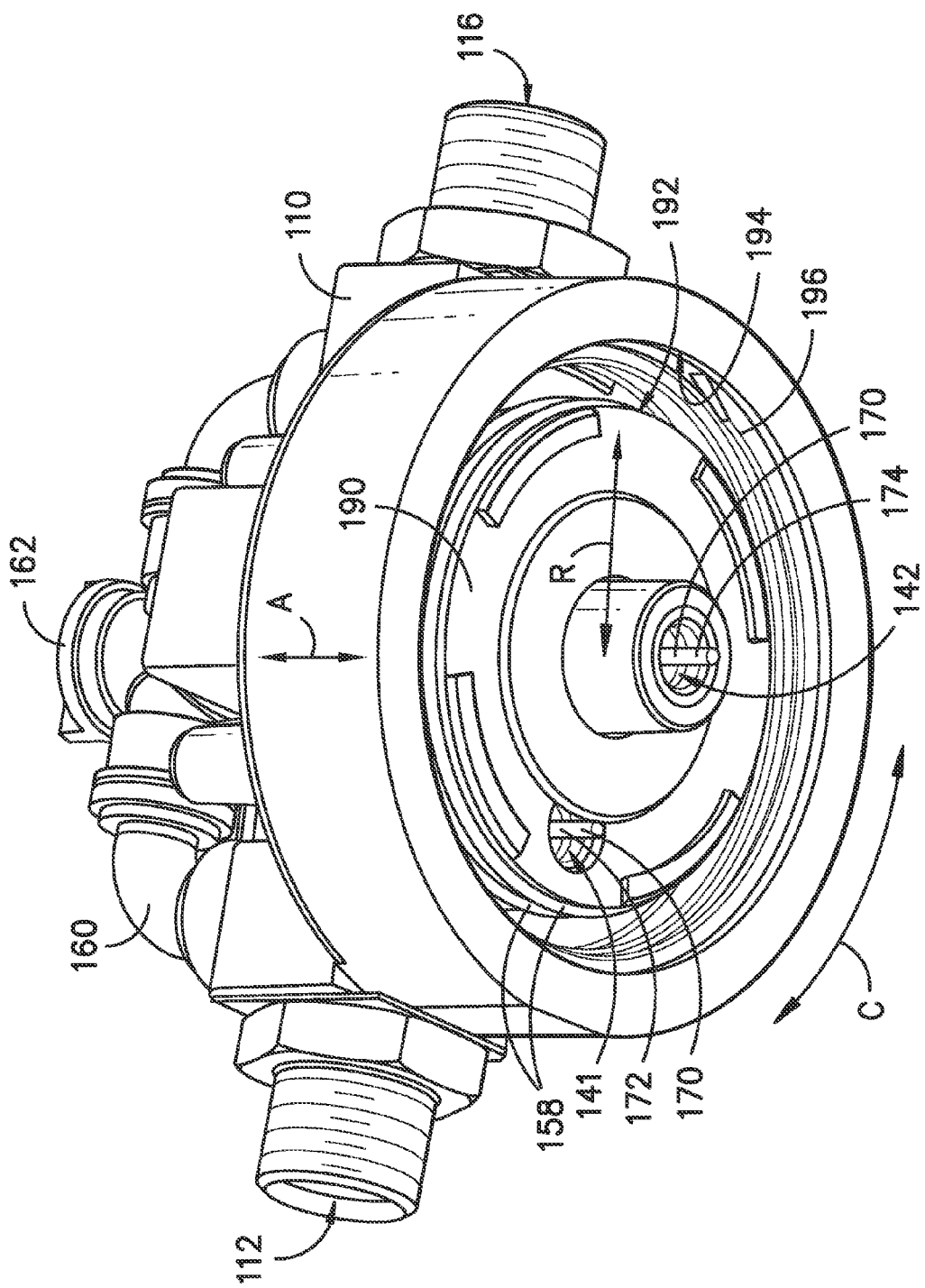
FIG. -6-

WATER FILTER ASSEMBLY

FIELD OF THE INVENTION

The present subject matter relates generally to water filter assemblies.

BACKGROUND OF THE INVENTION

Water filters are generally divided into two classes: point-of-entry water filters and point-of-use water filters. Point-of-entry water filters can be installed at a water line that supplies water to a building or residence in order to filter water entering the building or residence. Conversely, point-of-use water filters can be installed at a kitchen sink or within a refrigerator appliance in order to filter water entering such devices. In order to filter water, water filters are generally provided with a filtering media, such as a block of activated carbon or a pleated material.

In water filters with activated carbon filtering media, the activated carbon has pores that permit a flow of water through the block. By passing through the pores, contaminants such as sand, rust, and cysts within the flow of water can be mechanically filtered out of the water. Similarly, volatile organic compounds such as chloroform, lindane, and atrazine can be adsorbed into pore surfaces as water moves through the carbon block. In water filters with pleated filtering media, the water filter's filtering media generally removes contaminants such as sediment and other particles as water passes through pores in the filtering media. In such a manner, the water filter can remove such contaminants from water prior to delivering such water to a user.

Regardless of the type of filtering media, the filtering capacity of the filtering media generally decreases over time. For example, the filtering media's pores can become clogged or pore surfaces become saturated with contaminates. To insure that the filtering media has not exceeded its filtering capacity, the filtering media is preferably replaced or serviced at regular intervals regardless of its current performance. However, changing the filtering media can be a messy and time consuming task. For example, when the filtering media is removed, the water filter is generally filled with water, and such water can spill if the water filter is tipped or tilted during removal. Such spills can be time consuming and inconvenient to clean. Thus, certain consumers only replace the water filter's filtering media after it has become blocked, e.g., by sediment accumulation around and within the filtering media.

Accordingly, a water filter assembly with features for hindering spilling of water would be useful. In particular, a water filter assembly with features for hindering spilling of water during replacement of a filtering media of the water filter assembly would be useful.

BRIEF DESCRIPTION OF THE INVENTION

The present subject matter provides a water filter assembly. The water filter assembly includes a casing that is selectively mounted to a manifold. A filtering media is positioned within the casing for filtering a flow of water through the casing. The water filter assembly also includes features for hindering spilling of water during changing of the filtering media. Additional aspects and advantages of the invention will be set forth in part in the following description, or may be apparent from the description, or may be learned through practice of the invention.

In a first exemplary embodiment, a water filter assembly is provided. The water filter assembly defines an axial direction, a radial direction, and a circumferential direction. The water filter assembly includes a casing that defines a chamber for receipt of water to be filtered and a filtering media disposed within the chamber of the casing for filtering a flow of water through the chamber of the casing. A pair of caps is mounted to the filtering media. The caps are positioned at opposite axial ends of the filtering media. At least one of the caps has a projection that extends along the axial direction. A manifold defines an outlet for directing unfiltered water into the chamber of the casing and an inlet for receiving filtered water from the chamber of the casing. The casing is selectively mounted to the manifold. The water filter assembly also includes a pair of check valves. A first one of the check valves is mounted to the manifold at the outlet of the manifold. A second one of the check valves is mounted to the manifold at the inlet of the manifold. The first one of the check valves is configured for regulating a flow of water through the outlet of the manifold by selectively adjusting between an open position and a closed position. The first one of the check valves selectively engages the projection of the at least one of the caps in order adjust the first one of the check valves between the open position and the closed position.

In a second exemplary embodiment, a water filter assembly is provided. The water filter assembly defines an axial direction, a radial direction, and a circumferential direction. The water filter assembly includes a casing that defines a chamber for receipt of water to be filtered. The casing extends between a top portion and bottom portion along the axial direction. The casing has a lip positioned at the top portion of the casing. The lip has an inner surface. A filtering media is disposed within the chamber of the casing for filtering a flow of water through the chamber of the casing. A manifold defines an outlet for directing unfiltered water into the chamber of the casing and an inlet for receiving filtered water from the chamber of the casing. The casing is selectively mounted to the manifold. The manifold also has a sealing surface that faces the inner surface of the lip along the radial direction. A seal extends between the inner surface of the lip and the sealing surface of the manifold along the radial direction. The seal obstructs a flow of water out of the chamber of the casing through a gap between the inner surface of the lip and the sealing surface of the manifold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a perspective view of a water filter assembly according to an exemplary embodiment of the present subject matter.

FIG. 2 provides a section view of the exemplary water filter assembly of FIG. 1.

FIG. 3 provides an exploded view of the exemplary water filter assembly of FIG. 1.

FIG. 4 provides a partial section view of the exemplary water filter assembly of FIG. 1.

FIG. 5 provides a perspective section view of a manifold of the exemplary water filter assembly of FIG. 1.

FIG. 6 provides a bottom perspective view of the manifold of FIG. 5.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of a water filter assembly 100 according to an exemplary embodiment of the present subject matter. FIG. 2 provides a section view of water filter assembly 100, and FIG. 3 provides an exploded view of water filter assembly 100. Water filter assembly 100 can filter water from a water supply (not shown), such as a municipal water source or a well. Water filter assembly 100 can remove contaminants and other undesirable substances from water passing therethrough. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

Water filter assembly 100 may be used as a point-of-use water filter. For example, water filter assembly 100 may be used at or within any suitable appliance, such as a refrigerator appliance or an ice maker. Similarly, water filter assembly 100 may be installed beneath a sink. In alternative exemplary embodiments, water filter assembly 100 may be used as a point-of-entry water filtration system for an entire household or business.

Water filter assembly 100 defines an axial direction A, a radial direction R, and a circumferential direction C. Water filter assembly 100 also includes a manifold 110 and a casing 130 removably mounted to manifold 110. Fasteners (not shown) such as nails, pegs, tabs, screws, or bolts, may be used to mount manifold 110 and/or water filter assembly 100, e.g., within an appliance, to a kitchen cabinet beneath a kitchen sink, or to a wall within a house. Manifold 110 defines an entrance 112 and an exit 114. Entrance 112 may be in fluid communication with a water supply and receive unfiltered water from the water supply. From entrance 112, such unfiltered water is directed through water filter assembly 100. Such unfiltered water passes through water filter assembly 100 and exits manifold 110 at exit 114 as filtered water.

Casing 130 define a chamber 131 for receipt of water for filtering. Casing 130 extends between a top portion 150 and a bottom portion 152, e.g., along the axial direction A. Casing 130 defines an opening 133 at top portion 150 of casing 130. Opening 133 permits access to chamber 131 of casing 130. Casing 130 is removably mounted to manifold 110 as discussed in greater detail below.

Manifold 110 further defines an outlet 141 and an inlet 142 for directing water into and out of chamber 131 of casing 130, respectively. As may be seen in FIG. 2, outlet 141 is in fluid communication with entrance 112 of manifold 110 and with chamber 131 of casing 130. Thus, unfiltered water can enter chamber 131 of casing 130 through outlet 141 of manifold 110. Similarly, inlet 142 of manifold 110 is in fluid communication with exit 114 of manifold 110 and chamber 131 of casing 130. Thus, filtered water can exit chamber 131 of casing 130 through inlet 142 of manifold 110.

A water filter cartridge 120 is disposed within chamber 131 and is accessible and/or replaceable via opening 133 of casing 130. Water filter cartridge 120 includes a filtering media 132, e.g., a cylindrical filtering media. Filtering media 132 divides chamber 131 into an unfiltered volume 144 and a filtered volume 146. Filtering media 132 can remove impurities and contaminants from water passing through filtering media 132 from unfiltered volume 144 to filtered volume 146. Filtering media 132 can include any suitable mechanism for filtering water within water filter assembly 100. For example, filtering media 132 may include an activated carbon block, a reverse osmosis membrane, a pleated polymer or cellulose sheet, or a melt blown or spun cord media.

As used herein, the term "unfiltered" describes a volume within chamber 131 that is not filtered relative to filtering media 132. However, as will be understood by those skilled in the art, water filter assembly 100 may include additional filters that filter water entering chamber 131. Thus, "unfiltered volume" may be filtered relative to other filters but not filtering media 132.

As an example, water passing though water filter assembly 100 can follow a path through water filter assembly 100. In particular, unfiltered water can enter water filter assembly 100 through entrance 112 of manifold 110. Such unfiltered water can then flow though outlet 141 of manifold 110 into unfiltered volume 144 of chamber 131. Such unfiltered water can pass though filtering media 132 to remove impurities and can exit filtering media 132 into filtered volume 146 of chamber 131 as filtered water. Such filtered water can then pass through inlet 142 of manifold 110 and exit water filter assembly 100 through exit 114 of manifold 110. In such a manner, unfiltered water can follow the path through water filter assembly 100. In particular, unfiltered water can pass though filtering media 132, and filtered water can exit water filter assembly 100. Such filtering can improve taste and/or safety of water.

Water filter assembly 100, e.g., water filter cartridge 120, also includes a pair of caps 125. In particular, caps 125 include a first cap 126 and a second cap 128. Caps 125 are mounted to filtering media 132. In particular, caps 125 are positioned at opposite axial ends of filtering media 132. Thus, first cap 126 is mounted to filtering media 132 at a first end portion 122 of water filter cartridge 120. Conversely, second cap 128 is mounted to filtering media 132 at a second end portion 124 of water filter cartridge 120. First and second end portions 122 and 124 of water filter cartridge 120 are spaced apart from each other, e.g., along the axial direction A. Caps 125 can be mounted to filtering media 132 using any suitable mechanism. For example, caps 125 may be mounted to filtering media 132 using glue, compression fit, over-molding, ultrasonic welding, etc.

To support water filter cartridge 120 within casing 130, casing 130 includes a brace 156 mounted at or proximate bottom portion 152 of casing 130 within chamber 131 of casing 130. In particular, brace 156 may be integrally mounted or molded to casing 130. Brace 156 of casing 130 engages water filter cartridge 120 at second end portion 124 of water filter cartridge 120, e.g., second cap 128, in order to support water filter cartridge 120 within chamber 131 of casing 130. Similarly, a brace 134 of manifold 110 engages water filter cartridge 120 at first end portion 122 of water filter cartridge 120, e.g., first cap 136, in order to support water filter cartridge 120 within chamber 131 of casing 130. In particular, first end portion 122 of water filter cartridge 120 engages brace 134 of manifold 110 at or proximate inlet 142 of manifold 110 in order to support water filter cartridge 120 within chamber 131 of casing 130. Thus, water filter cartridge 120 may be supported at first and second end portions 122 and 124 of water filter cartridge 120 within casing 130.

Water filter assembly 100 also includes a pair of check valves 170. Check valves 170 includes a first check valve 172 and a second check valve 174. First check valve 172 is mounted to manifold 110, e.g., an insert 190 of manifold 110, at outlet 141 of manifold 110. Conversely, second check valve 174 is mounted to manifold 110, e.g., insert 190 of manifold 110, at inlet 142 of manifold 110.

Check valves 170 are configured for regulating a flow of water through outlet 141 and inlet 142 of manifold 110. In particular, first check valve 172 is configured for regulating a flow of water through outlet 141 of manifold 110. For example, first check valve 172 can selectively adjust between an open position and a closed position, e.g., depending upon the location of casing 130 relative to manifold 110. Similarly, second check valve 174 is configured for regulating a flow of water through inlet 142 of manifold 110. For example, second check valve 174 can selectively adjust between an open position and a closed position, e.g., depending upon the location of casing 130 relative to manifold 110. In the open position, check valves 170 can permit water to flow through check valves 170. Conversely, check valves 170 can hinder or obstruct a flow of water through check valves 170 in the closed position.

It should be understood that water filter assembly 100 can include multiple check valves for regulating the flow of water through outlet 141 of manifold 110. In particular, outlet 141 of manifold 110 can extend, e.g., annularly, along the circumferential direction C about inlet 142 of manifold 110. Multiple check valves can be distributed along the circumferential direction C about inlet 142 of manifold 110 in order to regulate the flow of water through outlet 141 of manifold 110. In such a manner, sufficient water can flow through outlet 141 of manifold 110 such that outlet 141 of manifold 110 does not limit that flow of water through water filter assembly 100 and act as a chokepoint.

Water filter assembly 100, e.g., manifold 110, further includes a bypass conduit 160. Bypass conduit 160 extends between about entrance 112 of manifold 110 and about exit 114 of manifold 110. Water can selectively flow through bypass conduit 160 rather than through chamber 131 of casing 130 and filtering media 132. For example, a user can utilize a bypass valve 162 to selectively place entrance 112 of manifold 110 in fluid communication with exit 114 of manifold 110 through bypass conduit 160, e.g., such that water flows through bypass conduit 160 rather than through chamber 131 of casing 130 and filtering media 132.

Water filter assembly 100, e.g., casing 130, also defines a drain conduit 164, e.g., at bottom portion 152 of casing 130. Drain conduit 164 is in fluid communication with chamber 131 of casing 130. By removing a bung 166, chamber 131 of casing 130 can be drained. For example, gravity can urge water within chamber 131 of casing 130 out of chamber 131 of casing 130 through drain conduit 164 when bung 166 is removed from drain conduit 164. In such a manner, a user can utilize drain conduit 164 to selectively direct water out of chamber 131 of casing 130.

FIG. 4 provides a partial section view of water filter assembly 100. FIG. 5 provides a perspective section view of manifold 110. In FIG. 4, casing 130 is mounted to manifold 110. Conversely, manifold 110 is shown without casing 130 mounted thereto in FIG. 5. As discussed in greater detail below, check valves 170 are configured to be in the open position when casing 130 is mounted to manifold 110 as shown in FIG. 4, and check valves 170 are configured to be in the closed position when casing 130 is not mounted to manifold 110 as shown in FIG. 5. Thus, check valves 170 can shift between the open and closed positions depending upon whether casing 130 is mounted to manifold 110. FIG. 6 provides a bottom perspective view of manifold 110 of water filter assembly 100.

As may be seen in FIG. 4, at least one of caps 125, e.g., first cap 126 and/or second cap 128, has an engagement surface 135. Further, at least one of caps 125, e.g., first cap 126 and/or second cap 128, includes a projection 136 positioned at or adjacent engagement surface 135. Projection 136 extends away from engagement surface 135, e.g., along the axial direction A. First check valve 172 can selectively engage engagement surface 135 and/or projection 136. In particular, first check valve 172 can selectively engage engagement surface 135 and/or projection 136 in order adjust first check valve 172 between the open position and the closed position. For example, when first check valve 172 engages engagement surface 135 and/or projection 136, engagement surface 135 and/or projection 136 can push first check valve 172, e.g., upwardly along the axial direction A, to the open position and maintain or hold first check valve 172 in the open position. Conversely, when casing 130 is dismounted or removed from manifold 110, first check valve 172 can shift, e.g., downwardly along the axial direction A, towards the closed position. Thus, when engagement surface 135 and/or projection 136 moves away from manifold 110, e.g., along the axial direction A, first check valve 172 can hinder the flow of water through outlet 141 of manifold 110 by shifting to the closed position.

Similarly, at least one of caps 125, e.g., first cap 126 and/or second cap 128, also has a contact surface 139. Second check valve 174 can selectively engage contact surface 139. In particular, second check valve 174 can selectively engage contact surface 139 in order adjust second check valve 174 between the open position and the closed position. For example, when second check valve 174 engages contact surface 139, contact surface 139 can push second check valve 174, e.g., upwardly along the axial direction A, to the open position and maintain or hold second check valve 174 in the open position. Conversely, when casing 130 is dismounted or removed from manifold 110, second check valve 174 can shift, e.g., downwardly along the axial direction A, towards the closed position. Thus, when contact surface 139 moves away from manifold 110, e.g., along the axial direction A, second check valve 174 can hinder the flow of water through inlet 142 of manifold 110 by shifting to the closed position.

Contact surface 139 and engagement surface 135 can have any suitable location on water filter cartridge 120, e.g., caps 125, relative to each other. For example, contact surface 139 and engagement surface 135 may be spaced apart from each other, e.g., along at least one of the radial direction R and the axial direction A. Thus, contact surface 139 and engagement surface 135 may be spaced apart from each other, e.g., along the radial direction R and/or the axial direction A. Similarly, contact surface 139 and projection 136 may be spaced apart from each other, e.g., along at least one of the radial direction R and the axial direction A. Thus, contact surface 139 and projection 136 may be spaced apart from each other, e.g., along the radial direction R and/or the axial direction A.

As discussed above, check valves 170 can shift between the open and closed positions depending upon whether casing 130 is mounted to manifold 110. In such a manner, check valves 170 can assist within hindering spilling of water, e.g., during changing of water filter cartridge 120. For example, to replace water filter cartridge 120, a user can remove casing 130 from manifold 110 and remove water filter cartridge 120 from chamber 131 of casing 130 through opening 133. When the user removes casing 130 from manifold 110, check valves 170 can shift to the closed position, e.g., in order to hinder water from flowing out of manifold 110 through outlet 141 of manifold 110 and/or inlet 142 of manifold 110. Thus, check valves 170 can assist with limiting spilling of water when casing 130 is removed from manifold 110. Water filter assembly 100 also includes other features for limiting or hindering spilling of water when casing 130 is removed from manifold 110, e.g., during changing of water filter cartridge 120. Such features are discussed in greater detail below.

As may be seen in FIG. 4, casing 130 also has a lip 180. Lip 180 is positioned, e.g., at top portion 150 of casing 130. Lip 180 of casing 130 has an inner surface 182 and an outer surface 184. Inner and outer surfaces 182 and 184 of lip 180 are spaced apart from each other, e.g., along the radial direction R. For example, inner and outer surfaces 182 and 184 of lip 180 are positioned on opposite sides of lip 180, e.g., along the radial direction R.

Manifold 110 includes insert 190 that is, e.g., received within chamber 131 of casing 130 when casing 130 is mounted to manifold 110. Manifold 110 has a sealing or outer surface 192 and an inner surface 194. Outer surface 192 of manifold 110 can be defined by inert 190 of manifold. Outer and inner surfaces 192 and 194 of manifold 110 are spaced apart from each other, e.g., along the radial direction R. For example, outer and inner surfaces 192 and 194 of manifold 110 can face each other, e.g., along the radial direction R.

Outer surface 192 of manifold 110 is positioned adjacent and faces inner surface 182 of lip 180, e.g., along the radial direction R when casing 130 is mounted to manifold 110. At least one seal 158, such as an O-ring that extends about outer surface 192 of manifold 110 along the circumferential direction C, extends between inner surface 182 of lip 180 and outer surface 192 of manifold 110, e.g., along the radial direction R. Seal 158 hinders a flow of water out of opening 133 of casing 130 when casing 130 is mounted to manifold 110. In particular, seal 158 can obstruct a flow of water out of chamber 131 of casing 130 through a gap 140 defined between casing 130 and manifold 110, e.g., between inner surface 182 of lip 180 and outer surface 192 of manifold 110.

Seal 158 can be mounted to casing 130 or manifold 110. For example, as shown in FIG. 4, insert 190 of manifold 110 can define a channel (not shown) that receives seal 158 in order to mount seal 150 to manifold 110. In alternative exemplary embodiments, seal 158 can be mounted to casing 130 or manifold 110 in any suitable manner, such as an adhesive, clips, fasteners, etc.

The position of seal 158 relative to a top surface 188 of lip 180 can assist with limiting spilling of water, e.g., when casing 130 is removed from manifold 110 during changing of water filter cartridge 120. In particular, seal 158 is spaced apart from top surface 188 of lip 180, e.g., along the axial direction A. Thus, seal 158 is positioned within chamber 131 of casing 130 below top surface 188 of lip 180, e.g., along the axial direction A, when casing 130 is mounted to manifold 110 as shown in FIG. 4. As will be understood by those skilled in the art, a level of water within chamber 131 of casing 130 can be limited by seal 158. For example, seal 158 can hinder the level of water within chamber 131 of casing 130 from rising above seal 158 when casing 130 is mounted to manifold 110. Thus, the level of water within chamber 131 of casing 130 can be kept below top surface 188 of lip 180, e.g., along the axial direction A, when casing 130 is mounted to manifold 110. Thus, a user can avoid spilling water from chamber 131 of casing 130 when a user removes casing 130 from manifold 110 due to the height of water within chamber 131 of casing 130.

As may be seen in FIG. 4, water filter assembly 100 can include two seals 158. However, in alternative exemplary embodiments, seals 158 can include any suitable number of seals. For example, seals 158 may include one, three, four, or more seals. Seals 158 can be spaced apart from each other, e.g., along the axial direction A.

Casing 130 can be mounted to manifold 110 in any suitable manner. For example, in the exemplary embodiment shown in FIG. 4, casing 130, e.g., lip 180, has a screw thread 186. Screw thread 186 of casing 130 is mounted at outer surface 184 of lip 180. Manifold 110, e.g., insert 190, also has a screw thread 196. Screw thread 196 of manifold 110 is mounted at inner surface 194 of manifold 110. Screw thread 186 of casing 130 selectively engages screw thread 196 of manifold 110 in order to mount casing 130 to manifold 110. Thus, screw thread 186 of casing 130 is configured for engaging with screw thread 196 of manifold 110 in order to mount casing 130 to manifold 110. For example, screw thread 186 of casing 130 engages screw thread 196 of manifold 110 when casing 130 is mounted to manifold 110.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water filter assembly that defines an axial direction, a radial direction, and a circumferential direction, the water filter assembly comprising:

a casing that defines a chamber for receipt of water to be filtered, the casing also defining an opening at a top edge of the casing, the casing having a lip positioned at a top portion of the easing;

a removable filtering media disposed within the chamber of the casing for filtering a flow of water through the chamber of the casing, the opening of the casing sized for removing and inserting the filtering media within the chamber of the casing;

a pair of caps separate from the casing and positioned directly on the filtering media inside the casing at opposite axial ends of the filtering media, at least one of the caps having a projection that extends along the axial direction;

a manifold defining an outlet for directing unfiltered water into the chamber of the casing and an inlet for receiving filtered water from the chamber of the casing the casing selectively mounted to the manifold, the manifold also having an insert, the insert disposed within the chamber of the casing when the casing is mounted to the manifold;

at least one seal extending between an outer surface of the insert and an inner surface of the lip along the radial direction when the casing is mounted to the manifold, the at least one seal positioned below a top surface of the lip along the axial direction when the casing is mounted to the manifold; and a pair of check valves, a first one of the check valves mounted to the manifold at the outlet of the manifold, a second one of the check valves mounted to the manifold at the inlet of the manifold, the first one of the check valves configured for regulating a flow of water through the outlet of the manifold by selectively adjusting between an open position and a closed position, the first one of the check valves selectively engaging the projection of at least one of the caps having the projection in order to adjust the first one of the check valves between the open position and the closed position.

2. The water filter assembly of claim 1, wherein the first one of the check valves contacts the projection of at least one of the caps having the projection in order maintain the first one of the check valves in the open position, the first one of the check valves shifting towards the closed position when the projection of at least one of the caps having the projection is moved away from the manifold along the axial direction, the first one of the check valves hindering the flow of water through the outlet of the manifold in the closed position.

3. The water filter assembly of claim 2, wherein at least one of the caps having the projection includes a contact surface, the second one of the check valves contacting the contact surface of at least one of the caps having the projection in order maintain the second one of the check valves in the open position, the second one of the check valves shifting towards the closed position when the contact surface of at least one of the caps having the projection is moved away from the manifold along the axial direction, the second one of the check valves hindering the flow of water through the inlet of the manifold in the closed position.

4. The water filter assembly of claim 3, wherein the projection of at least one of the caps having the projection is spaced apart from the contact surface of at least one of the caps having the projection along the radial direction.

5. The water filter assembly of claim 4, wherein the projection of at least one of the caps having the projection is spaced apart from the contact surface of at least one of the caps having the projection along the axial direction.

6. The water filter assembly of claim 1, wherein the at least one seal comprises a plurality of O-rings.

7. The water filter assembly of claim 1, wherein the lip of the casing has an outer surface positioned opposite the inner surface of the lip along the radial direction, the casing also having a screw thread mounted at the outer surface of the lip, the manifold having an inner surface spaced apart from the sealing surface of the manifold along the radial direction, the manifold also having a screw thread mounted at the inner surface of the manifold, the screw thread of the casing configured for engaging the screw thread of the manifold in order to mount the casing to the manifold.

8. The water filter assembly of claim 1, wherein each cap of the caps has the projection that extends along the axial direction.

9. The water filter assembly of claim 1, wherein the manifold defines an entrance for receiving unfiltered water and an exit for directing filtered water out of the manifold, the manifold further comprising a bypass conduit that extends between the entrance of the manifold and the exit of the manifold and a bypass valve for selectively placing the entrance of the manifold in fluid communication with the exit of the manifold through the bypass conduit.

10. The water filter assembly of claim 1, wherein the casing extends between the top portion and a bottom portion along the axial direction the casing defining a drain conduit at the bottom portion of the casing, the drain conduit being in fluid communication with the chamber of the casing in order to selectively direct water out of the chamber of the casing.

11. A water filter assembly that defines an axial direction, a radial direction, and a circumferential direction, the water filter assembly comprising:
 a cylindrical casing that defines a chamber for receipt of water to be filtered, the casing extending between a top portion and a bottom portion along the axial direction, the casing defining an opening at a top edge of the casing, the casing also having a lip positioned at the top portion of the casing;
 a removable filtering medium disposed within the chamber of the casing for filtering a flow of water through the chamber of the casing, the filtering medium removable from the chamber of the casing through the opening of the casing;
 a pair of caps separate from the casing and positioned directly on the filtering media inside the casing, the caps of the pair of caps being discrete from each other and positioned at opposite ends of the filtering medium, at least one of the caps having a projection that extends along the axial direction;
 a manifold defining an outlet for directing unfiltered water into the chamber of the casing and an inlet for receiving filtered water from the chamber of the casing, the casing selectively mounted to the manifold, the manifold also having an insert that extends downwardly along the axial direction into the chamber of the casing when the casing is mounted to the manifold;
 at least one seal extending between the insert and the lip along the radial direction when the casing is mounted to the manifold, the at least one seal positioned below a top surface of the lip along the axial direction when the casing is mounted to the manifold; and
 a pair of check valves, a first one of the check valves mounted to the manifold at the outlet of the manifold, a second one of the check valves mounted to the manifold at the inlet of the manifold, the first one of the check valves configured for regulating a flow of water through the outlet of the manifold by selectively adjusting between an open position and a closed position, the first one of the check valves selectively contacting the projection of at least one of the caps having the projection in order to adjust the first one of the check valves between the open position and the closed position.

12. The water filter assembly of claim 11, wherein at least a portion of each check valve of the pair of check valves is positioned within the chamber of the casing when the casing is mounted to the manifold.

13. The water filter assembly of claim 11, wherein at least one of the caps having the projection includes a contact surface, the second one of the check valves contacting the contact surface of at least one of the caps having the projection in order maintain the second one of the check valves in the open position, the second one of the check valves shifting towards the closed position when the contact surface of at least one of the caps having the projection is moved away from the manifold along the axial direction, the second one of the check valves hindering the flow of water through the inlet of the manifold in the closed position.

14. The water filter assembly of claim 13, wherein the projection of at least one of the caps having the projection is spaced apart from the contact surface of at least one of the caps having the projection along the radial direction.

15. The water filter assembly of claim 14, wherein the projection of at least one of the caps having the projections is spaced apart from the contact surface of at least one of the caps having the projection along the axial direction.

16. The water filter assembly of claim 11, wherein the at least one seal comprises a plurality of O-rings.

17. The water filter assembly of claim 11, wherein the lip of the casing has an outer surface positioned opposite an inner surface of the lip along the radial direction, the casing also having a screw thread mounted at the outer surface of the lip, the manifold having an inner surface spaced apart from the sealing surface of the manifold along the radial direction, the manifold also having a screw thread mounted at the inner surface of the manifold, the screw thread of the casing configured for engaging the screw thread of the manifold in order to mount the casing to the manifold.

18. The water filter assembly of claim 11, wherein each cap of the caps has the projection that extends along the axial direction into the Chamber of the casing when the casing is mounted to the manifold.

19. The water filter assembly of claim 11, wherein the manifold defines an entrance for receiving unfiltered water and an exit for directing filtered water out of the manifold, the manifold further comprising a bypass conduit that extends between the entrance of the manifold and the exit of the manifold and a bypass valve for selectively placing the entrance of the manifold in fluid communication with the exit of the manifold through the bypass conduit.

20. The water filter assembly of claim 11, wherein the casing defines a drain conduit at the bottom portion of the casing, the drain conduit being in fluid communication with the chamber of the casing in order to selectively direct water out of the chamber of the casing.

\* \* \* \* \*